United States Patent [19]
Sitter et al.

[11] Patent Number: 5,791,743
[45] Date of Patent: Aug. 11, 1998

[54] BEAM TO AXLE WELD STIFFENER

[75] Inventors: Don H. Sitter; M. Andrew Power, both of Montgomery, Ala.; Kent Eugene Davison, Columbia City, Ind.

[73] Assignee: Dana Corporation, Toledo, Ohio

[21] Appl. No.: 746,542

[22] Filed: Nov. 13, 1996

[51] Int. Cl.$^6$ .................................................. B60B 35/00
[52] U.S. Cl. ........................ 301/125; 301/130; 280/688
[58] Field of Search .............................. 301/124.1, 125, 301/126, 129, 130, 131, 132, 137; 74/607; 280/688, 713

[56] References Cited

U.S. PATENT DOCUMENTS

| | | | |
|---|---|---|---|
| 1,908,335 | 5/1933 | Evans | 301/126 X |
| 2,971,772 | 2/1961 | Tantlinger et al. | 280/713 |
| 3,000,651 | 9/1961 | Gouirand | 280/713 |
| 3,915,504 | 10/1975 | Bauer | 301/130 |
| 4,120,509 | 10/1978 | Reeve et al. | 280/81 A |
| 4,310,200 | 1/1982 | Olender | 301/129 |
| 4,775,166 | 10/1988 | Van Denberg | 280/677 |
| 4,789,181 | 12/1988 | Baxter | 280/681 |
| 4,871,188 | 10/1989 | Baxter | 280/680 |
| 5,476,251 | 12/1995 | Moses et al. | 288/688 X |

*Primary Examiner*—Russell D. Stormer
*Attorney, Agent, or Firm*—Oldham & Oldham, Co., L.P.A.

[57] ABSTRACT

A device for stiffening an axle of a vehicle in the vicinity of a weld connecting the axle to a suspension beam of the vehicle has a cradle portion to be aligned along the axle. Radially extending flanges are attached along the side edges of the essentially semi-cylindrical cradle portion. The flanges provide a site for apertures for the conventional U-bolts which connect the axle to the suspension beam. In an alternate embodiment, the ends of the device are further stiffened by the addition of webs mounted transverse to the axis of the cradle portion. If the webs are paired at each end in a spaced apart relationship, they can provide a site for use of additional U-bolts to affix the device to the axle. The cradle portion effectively covers one half of the circumference of the axle when in position.

9 Claims, 3 Drawing Sheets

5,791,743

BEAM TO AXLE WELD STIFFENER

The present invention relates to a device for providing additional support and stiffening to a weld, particularly a weld affixing an axle to a suspension of a vehicle. More particularly, the present invention relates to a device for providing additional resistance to a "fore-aft" type deflection of the axle at the point of the weld to remediate premature failure of the weld.

BACKGROUND OF THE INVENTION

In a vehicle, particularly a trailer, the axles are attached to the body of the vehicle through a suspension system. In many trailers, the axles are paired in a tandem axle pair, with the forward and rear axles of the pair attached to a suspension of a type generally known as a trailing arm suspension. Such a suspension system provides two beams for the front axle and two beams for the rear axle of the vehicle. The forward and rear axle beam pairs are attached to pendant brackets from a steel frame superstructure of the vehicle. Each of the beam pairs is likewise attached to the respective axle at the trailing ends of the beams by a pair of welds near the ends of the axle. These welds may be generally characterized as longitudinal welds of the side surfaces of the axle to a saddle piece which is attached to the beam. In some of these suspensions, at least one resilient pneumatic chamber is provided between the beam and the vehicle frame to take up some of the articulation forces and load of the vehicle. These suspensions are generally referred to as "air-ride" suspensions.

As the vehicle moves, the axle is subjected to a variety of forces, but these forces may be generally resolved into three distinct component forces. First, there is a component which acts from side to side on the vehicle, that is, in an axial direction with reference to the axle. The second force is an "up-down", or vertical, radial deflection or oscillation of the axle. The third force is a "fore-aft", or horizontal, radial deflection or oscillation of the axle. Each of these forces acts upon the welds which secure the axle in a non-rotative fashion to the beam. Various means have been devised to protect the weld from the component forces, but premature failure of welds is still considered a problem. It is believed that protection of the weld from the "fore-aft" oscillations will go a long way in prolonging weld life.

SUMMARY OF THE INVENTION

It is therefore an object of the present invention to provide a device to stiffen the axle at the point of the welds to the saddle piece in such a way that the weld is more resistant to "fore-aft" or horizontal deflection of the axle. This object is achieved by a device for locally reinforcing an axle of a vehicle where the axle is welded to a suspension member of the vehicle and further held in place by a pair of spaced apart U-bolts which straddle the weld, encompass the axle and fasten the axle to the suspension member. The device comprises an essentially semi-cylindrical cradle having a concave inside surface with a radius sized to closely accommodate an outside radius of the axle, a convex outside surface and a length greater than the distance between the spaced-apart U-bolts. The cradle further has a radially-extending flange formed on each of the two open edges of the cradle. Each of the flanges is adapted with a pair of apertures passing through the flange for receiving the open arms of one of the pair of spaced apart U-bolts when the cradle is interposed between the U-bolt and the axle.

BRIEF DESCRIPTION OF THE DRAWINGS

Better understanding of the present invention will be had when reference is made to the accompanying drawings, in which identical parts are identified with identical reference numerals.

DETAILED DESCRIPTION OF THE DRAWINGS

Figure 1:
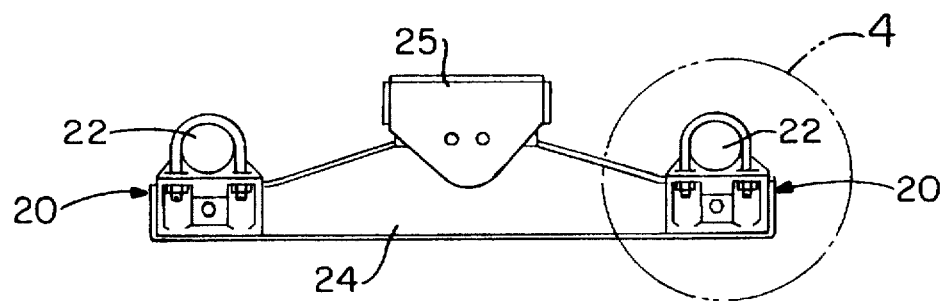
FIG. 1 shows a side elevation of a prior art trailer having a mechanical trailer suspension.
Figures 2, 3:
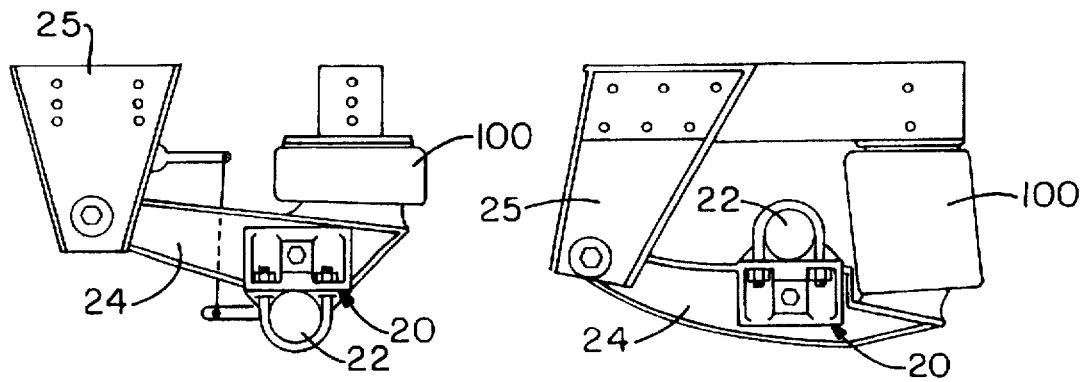
FIG. 2 is a side elevation of a prior art trailer having an air ride suspension.
FIG. 3 is a side elevation of a prior art trailer having a air ride suspension with a lift axle.

A series of drawings presents the prior art method for connecting axles to beams. FIG. 1 shows a typical mechanical axle-to-beam connection as viewed from the side; FIG. 2 shows a similar side view of an axle-to-beam connection in a trailer with an air-ride suspension, and FIG. 3 provides a side view of the axle-to-beam connection in a trailer having not only the air-ride suspension, but also a lift axle. Each of these Figures shows an overall axle-o-beam connection 20, an axle 22, a beam 24 and a hanger bracket 25. Additionally, FIGS. 2 and 3 show the "air-ride" suspension feature as provided by a resilient pneumatic chamber 100. The axle 22 may be seated either below the axle-to beam connection 20, as in FIG. 2, or atop the axle-to-beam connection, as in FIG. 3.

Figure 4:
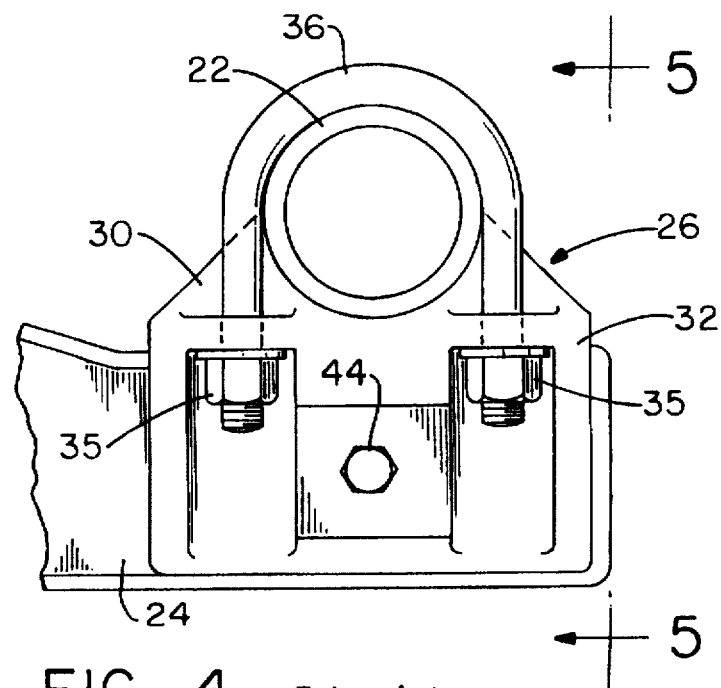
FIG. 4 is an enlarged view of prior art details of the axle to beam connection shown in FIG. 1.
Figure 5:
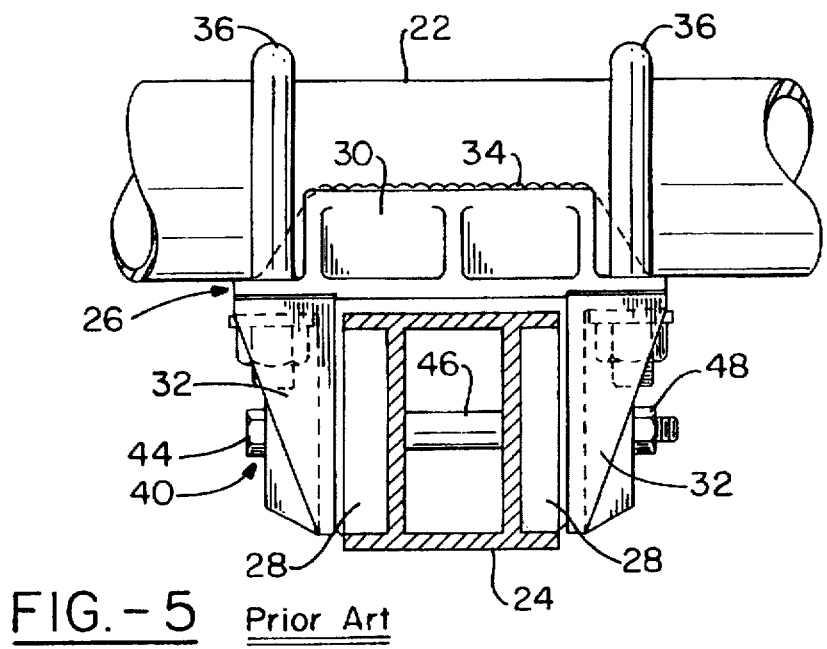
FIG. 5 is a view taken along Line 5—5 in FIG. 4, showing features known in the prior art.

Referring now to FIGS. 4 and 5, further features of the prior art axle-to-beam connection are revealed. FIG. 4 is an enlarged side view of one of the beam ends from FIG. 1 and FIG. 5 is a view of FIG. 4 along line 5—5. These Figures show that the axle-to-beam connection 20 includes a axle connection assembly 26 and beam connection plates 28. The axle connection assembly includes a saddle plate 30 and lower extension plates 32. The axle 22 rests upon the saddle plate 30 and a longitudinal weld 34 holds the axle in this positioned once it is seated. This weld 34 involves an edge surface of the saddle plate 30 and the side surface of the axle 22. Although only one side of the axle 22 is shown as welded in FIG. 5, it will be understood that a complementary weld is provided on the opposite side of the axle where it meets the edge surface of the saddle plate 30. These welds 34, while effectively preventing rotation of the axle 22 with respect to its longitudinal axis, are not sufficient in and of themselves to secure the axle to the beam 24. The real attachment of the axle 22 to the beam 24 occurs through U-bolts 36 and nuts 35. As particularly shown in FIG. 5, one of the U-bolts 36 is positioned on each side of the weld 34 so that the 6-bolts straddle the weld. These U-bolts 36 and the complementary nuts 35 serve to clamp the saddle plate 30 to the lower extension plates 32 and to encompass the axle 22 and hold it in the seated position shown. Because the saddle plate 30 runs along the length of the axle 22 for some distance and because it is placed along either the top or bottom surface of the axle (as shown in FIGS. 2 and 3), the saddle plate inherently provides a modicum of resistance to "up-down" axle deflection near the weld 34. Also, the saddle plate 30 provides this resistance along at least as much of the length of the axle 22 as the length of the weld 34. Bolt assembly 40, comprising bolt 44, sleeve 46 and nut 48 complete the attachment of the axle 22 to the beam 24. It will be recognized that no equivalent structure to the saddle plate 30 exists in the prior art configuration for providing resistance to "fore-aft" deflection near the weld 34. This is left to the present invention, as will now be explained.

FIGS. 6 through 9 show the present invention in isolation from the axle-beam connection and in operation with the axle-beam connection of a vehicle of the type discussed above.

Figure 6:
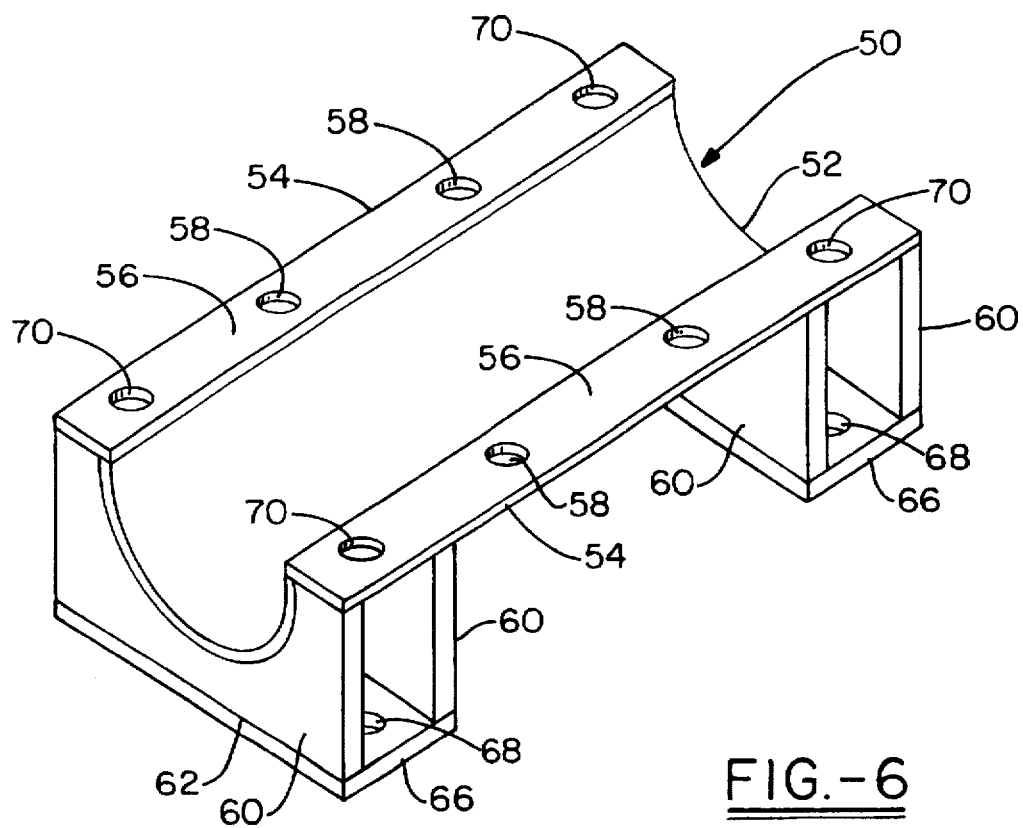
FIG. 6 is a perspective view of the present invention, in isolation.

Directing attention first to FIG. 6, the first element of the present invention is a cradle 50 which comprises in the preferred embodiment a length of tubing 52 of somewhat less than half-circular in cross-section. The length of the particular cradle 50 will be selected to conform with the particular axle-beam connection of interest. In the particular embodiment of interest to the inventors, the spacing provided for affixing the U-bolts 36 and nuts 35 which straddle the weld is about 7.25 inches center to center and the tubing is selected to be 15.25 inches long, so that 4 inches of tubing is provided for axle support on each end of the cradle 50 beyond the centerlines of the U-bolts 36 when they are in place. In this way, the cradle 50 provides substantially more support to the axle 22 with respect to "up-down" deflection than may be provided by the saddle plate 30. The inside radius of the tubing 52 should be selected so as to closely accommodate the outside radius of the axle 22 with which it will be used. For example, and again referring to a particular application of the invention to a known vehicle suspension system, the axle 22 will have a nominal outside radius of 2.5 inches. An appropriate length of tubing 52 for such an application will have an inside radius of nominally 2.5 inches, and a nominal outside radius of 3.0 inches, thereby providing approximately 0.5 inches of thickness. As stated above, the total length of the length of tubing is about 15.25 inches, which is slightly more than two times the centerline to centerline spacing of the U-bolts 36 straddling the weld 34 in the particular suspension system of interest.

In addition to the length of tubing 52, the cradle 50 is comprised of a pair of side flanges 54 which are welded to the length of tubing at the open edges of the tubing. Each of the side flanges 54 is a bar of metal, preferably the same as the tubing 52, with a length essentially equal to the length of the tubing, a width considerably smaller than the length, and a thickness in the range of the thickness of the length of tubing. Referring to the particular application described above, a bar of metal 15.25 inches long, 2.00 inches wide and 0.38 inches thick is appropriate for each side flange 54. The preferred cradle 50 of the present invention should provide a substantially planar top surface 56 formed by the side flanges 54, with the plane of the top surface passing through the centerline or axis of the tubing 52 as a diameter thereof. For that reason, it is necessary to start with a tubing section that is somewhat less than a half circle, so that the process of adding on the side flanges 54 effectively results in a cradle 50 that is essentially a half-circle in cross section.

The width of side flanges 54 is intended for two purposes. The first is to provide longitudinal stiffening to the cradle 50 along the entire length thereof. The second is to provide a site for four apertures 58 for the U-bolts 36. Since the U-bolts 36 encompass the axle 22 and secure the axle to the beam 24, passing the U-bolts through the side flanges 54 at the apertures 58 secures the cradle 50 longitudinally along the axle. More particularly, since the intent is to stiffen the axle 22 near the weld 34, the apertures 58 in the side flanges are paired so that the apertures in each side flange are spaced equidistant from the midpoint of the length of the side flange. If the U-bolts 36 are to be spaced 7.25 inches apart centerline to centerline (as indicated above) and the side flanges are 15.25 inches long, the apertures 58 will each be centered 4 inches from the end of the side flange. Clearly, the diameter of each aperture 58 will be large enough to receive the U-bolt 36 selected. When the U-bolts 36 are positioned into the cradle 50, the outside radius of the length of tubing 52 will rest against the bight portion of the U-bolt and the open arms of the U-bolts will extend upwardly from the top surface 56 in a substantially normal manner. This particular embodiment of the invention comprising the cradle 50 with its side flanges 54 and the apertures 58 for receiving the U-bolts 36 for holding the cradle against the axle 22 is referred to hereafter as the "simple splint" embodiment.

Although the simple splint as taught above is effective in providing the desired stiffening against "fore-aft" deflection of the axle 22, even more effective stiffening is provided by the addition of a further feature, resulting in the embodiment we refer to as the "complex splint." In this further embodiment, a pair of webs 60 of generally rectangular shape are mounted in parallel spaced apart relationship across the width of the cradle 50 at each end thereof so that the web pairs stiffen the cradle from "fore-aft" deflection. These webs 60 will be mounted on the convex outside surface of the cradle 50. Each of the webs 60 will be comprised of the same metal, preferably of the same thickness as the side flanges 54, with the length of each web 60 sufficient to span from the outside of one side flange 54 to the outside of the other. The height of each web 60 will be sufficient to span at least from the bottoms of the side flanges 54 to the bottom of the tubing portion, with a strong preference to provide a portion of metal extending below the tubing portion to provide a substantially flat mounting surface 62. To accommodate the tubing portion, an essentially semicircular portion of the web 60 is excised to provide an inner radius substantially the same as the outside radius of the length of tubing 52.

When two such webs 60 are mounted on the cradle 50 at or near one of the ends thereof by welding or the like in parallel spaced apart relationship, the mounting surfaces 62 on each web define a planar surface for mounting a nut backer bar 66 thereon. If the webs 60 are mounted such that their outside edges with respect to each other are about 2 inches apart, a nut backer bar 66 that is 2 inches wide, 9 inches long and 0.38 inches thick will be appropriate. Two apertures 68 should be bored through the nut backer bar 66 and these apertures should be aligned with a pair of apertures 70 on the side flange 54. In this manner, each set of aligned apertures 68, 70 provides a path for the open threaded ends of a U-bolt 72, and each of the open threaded ends may be secured to the nut backer bar 66 by an appropriate nut 74. U-bolts 72 are positioned 180 degrees opposite U-bolts 36 described above with the bight portion of U-bolts 72 bearing against the axle 22. Since U-bolts 72 are fastened to the axle at essentially the ends of cradle 50, axle 22 is constrained from deflection all along the length of the cradle. Because of webs 60 and the half-circular cross section of the cradle 50, the cradle is able to constrain not only vertical deflection, but also horizontal deflection, which is simply not possible using only the U-bolts 36 and the saddle plate 30 of the prior art. Because the cradle 50 extends longitudinally far beyond the U-bolts 36, they cannot act as fulcrums for horizontal deflection, as they can in the prior art mounting.

Figure 7:
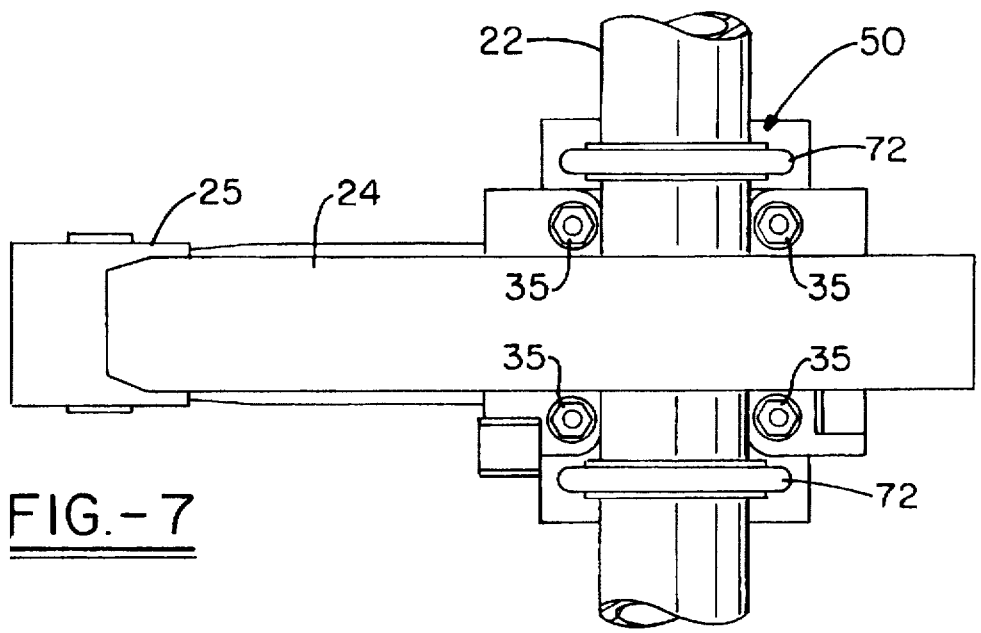
FIG. 7 is a top view of the present invention, as installed on a trailer suspension.
Figure 8:
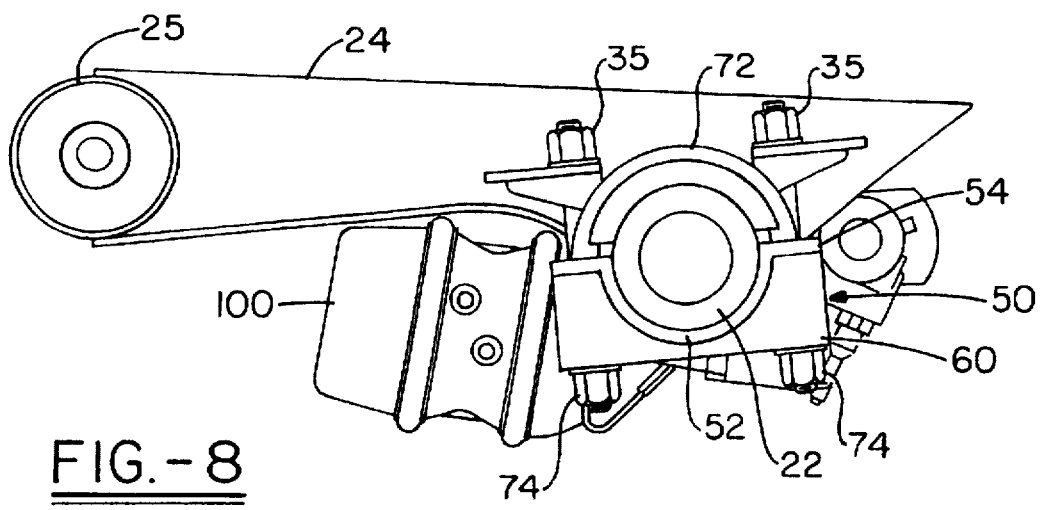
FIG. 8 is a side view of the present invention, as seen from the bottom of FIG. 7.
Figure 9:
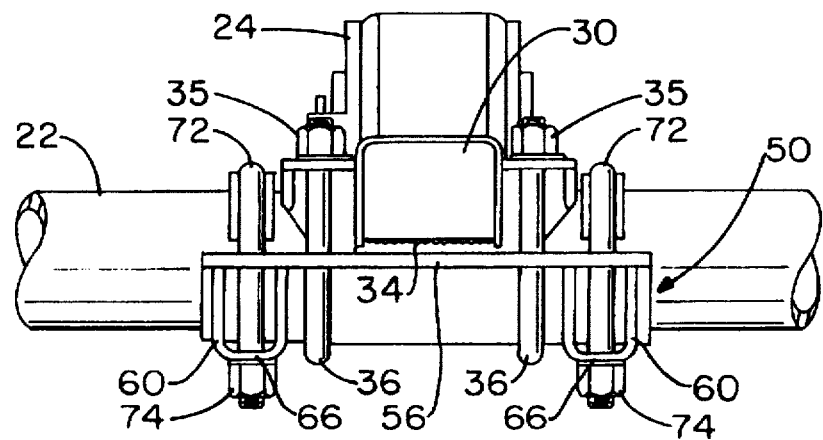
FIG. 9 is an end view of the present invention, as seen from the right side of FIG. 7.

Directing attention now to FIGS. 7 through 9, the complex splint embodiment of the present invention cradle 50 as shown in isolation is shown in operation on a trailer suspension with the same general features as described above with regard to FIGS. 1 through 5.

One advantage of the present invention is that it permits an axle to be effectively stiffened near a connecting weld without requiring that the axle itself be increased in diameter or thickness in that region. This localized stiffening technique permits the axle to be maintained at a suitable flexibility to permit necessary deflection along the length of the axle, and especially at the central portion, while constraining deflection near the weld. The particular advantage of the use of the stiffening webs and the associated U-bolts near the cradle ends is to allow the cradle to truly act as a "splint" and to constrain the cradle ends and the axle to joint movement.

Referring back to FIGS. 1 through 5, it will be readily understood that while the axle 22 is shown in FIGS. 1–4 as being mounted above the beam 24, the same advantages and objects of the present invention are equally available in situations where the axle is mounted below the beam.

When a prototype of the device of the present invention was subjected to laboratory testing and the results analyzed by a software program written to predict the expected increase in life of the weld under predictable stresses, the "complex splint" as taught in this disclosure was projected to have a longer life by a factor of ten over the unprotected weld which as taught in the prior art.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. In combination with a vehicle axle affixed to a suspension member of the vehicle by a longitudinal weld and further held in place by a first pair of spaced apart U-bolts which straddle the weld, encompass the axle and fasten the axle to the suspension member, an improved device for locally reinforcing the axle comprising:

an essentially semi-cylindrical cradle having a concave inside surface terminating in a pair of open edges with a radius sized to closely accommodate an outside radius of the axle, a convex outside surface and a length greater than the distance between the spaced-apart first pair of U-bolts;

said cradle further having a radially-extending flange formed on each of the pair of open edges, each said flange having a pair of spaced apart apertures therethrough, so that one of the apertures on each of the flanges may receive the open arms of one of the first pair of spaced apart U-bolts when the cradle is interposed between the U-bolt and the axle opposite the suspension member.

2. The combination of claim 1 wherein the radially extending flanges each have an outer surface which defines a plane passing through the axis of the cradle.

3. The combination of claim 1 wherein the pair of apertures on each flange are equally distant from the end of the flange nearest thereto.

4. The combination of claim 1 wherein at least one reinforcing web is mounted on the cradle transverse to the axis thereof on the convex outside surface near each end of said cradle.

5. The combination of claim 4 wherein two said reinforcing webs are mounted in spaced apart parallel relationship near each end.

6. The combination of claim 5 wherein the device further comprises a second pair of spaced apart U-bolts and corresponding nuts and the two said reinforcing webs are joined by a connecting member having a pair of spaced apart apertures, said spaced apart apertures on the connecting member aligned with a second pair of apertures, one of said second pair of apertures on each of the radially extending flanges of the cradle, so that the aligned apertures are adapted to receive the open arms of one of the second pair of U-bolts encompassing the axle, with the open ends of each of the second pair of spaced apart U-bolts against the connecting member with the corresponding nuts.

7. A device for locally reinforcing a point of attachment of a axle to a vehicle, the axle being affixed to a suspension member of the vehicle by a weld and further held in place by a first pair of spaced apart U-bolts which straddle the weld, encompass the axle and fasten the axle to the suspension member, comprising:

an essentially semi-cylindrical cradle having a concave inside surface terminating in a pair of open edges with a radius sized to closely accommodate an outside radius of the axle, a convex outside surface and a length greater than the distance between the spaced-apart first pair of U-bolts;

said cradle further having a radially-extending flange formed on each of the pair of open edges, each said flange adapted with a pair of apertures therethrough in a manner to receive the open arms of one of the pair of spaced apart U-bolts when the cradle is interposed between the U-bolt and the axle opposite the suspension member; and where at least one reinforcing web is mounted on the cradle transverse to the axis thereof on the convex outside surface near each end of said cradle.

8. The device of claim 7 wherein two said reinforcing webs are mounted in spaced apart parallel relationship near each end.

9. The device of claim 8 wherein the device further comprises a second pair of spaced apart U-bolts and the corresponding nuts therefor and the two said reinforcing webs are joined by a connecting member having a pair of spaced apart apertures, said spaced apart apertures on the connecting member aligned with a second pair of apertures, one of said second pair of apertures on each of the radially extending flanges of the cradle, so that the aligned apertures are adapted to receive the open arms of one of the second pair of U-bolts encompassing the axle, with the open ends of each of the second pair of spaced apart U-bolts against the connecting member with the corresponding nuts.

* * * * *